Patented Nov. 22, 1949

2,488,832

UNITED STATES PATENT OFFICE 2,488,832

COMPOSITIONS OF MATTER SUITABLE FOR REMOVING HEAVY METAL OXIDES OR WATER-INSOLUBLE HEAVY METAL SALTS

Carlo Rossi, Basel, Switzerland, assignor to Ciba Limited, a Swiss firm

No Drawing. Application June 6, 1947, Serial No. 753,048. In Switzerland June 27, 1946

6 Claims. (Cl. 252—105)

The present invention relates to compositions of matter suitable for removing heavy metal oxides or water-insoluble heavy metals salts from materials on which such oxides or salts are present.

According to this invention the heavy metal oxides or water-insoluble heavy metal salts are removed by treating the material to be cleansed with a, preferably alkaline, solution which contains a salt of an acid free from nitrogen and capable of forming water-soluble complex heavy metal compounds and also contains a powerful reducing agent which is capable of reducing the ferric state to the ferrous state without the evolution of hydrogen and the reducing power of which is greater than that of glucose.

As acids capable of forming water-soluble complex heavy metal compounds there come into consideration carboxylic acids and sulfonic acids. Among the carboxylic acids capable of forming complex salts there may be mentioned, for example, oxalic acid, further hydroxy-carboxylic acids such as lactic acid, and especially polybasic hydroxy-carboxylic acids, such as malic acid, tartaric acid, citric acid, saccharic acid and moreover thioglycollic acid. As sulfonic acids capable of forming complex heavy metal compounds there may be used with advantage the sulfonic acids present in sulfite cellulose waste liquor. For this purpose the sulfite waste liquor obtained in the working up of cellulose may be used without further purification. In this case it may be of advantage to exclude as far as possible the oxidizing action of atmospheric oxygen during the storage or evaporation of the sulfite waste liquor. As further examples of sulfonic acids capable of forming heavy metal complexes there may be mentioned guaiacol sulfonic acids.

As reducing agents there are suitable, for example, water-soluble salts of hydrosulfurous acid, and also other inorganic or organic reducing agents the reducing power of which is greater than that of glucose, such as, for example, hydrazine sulfate.

The cleansing solutions used in the invention are adjusted to a pH value of at least 7, and advantageously to a higher pH value, depending on the resistance to alkali of the complex compound produced thereby. Generally it is not advisable to select a pH-value above 12.

In most cases it is recommended to use solutions rendered alkaline with ammonia or with bicarbonate or sodium carbonate. These compounds having a relatively weakly alkaline reaction are generally to be preferred to compounds having a stronger alkaline reaction.

The method of the invention is especially suitable for cleansing surfaces composed of heavy metals, such as iron or iron alloys. However, other materials, such as undyed textile fabrics, for example, those of cotton or regenerated cellulose, can be freed from heavy metal oxides or water-insoluble heavy metal oxides or water-insoluble heavy metal salts. In the latter case the material is placed in a solution of the kind described above and, when the action is complete, the duration of which depends on the extent of contamination of the material, the material is washed with water and dried.

In order to remove oxide layers and water-insoluble metal salts from surfaces composed of heavy metals or heavy metal alloys the corroded metal article may, in accordance with the invention, be placed in a bath containing, for example, 1-50 per cent. of a water-soluble salt of the complex-forming acid, 2-8 per cent. of calcined sodium carbonate and 1-20 per cent. (in any case more than 0.1 per cent.) of sodium hydrosulfite, and allowed to remain in the bath for 12-24 hours. At the end of this period the metal article can be washed clean with water, in certain cases with light brushing.

In order to prolong the period of usefulness of the cleansing bath it is advisable to close the vessel in which the cleansing operation is carried out, especially in the case of the removal of rust, so as to exclude in this manner the harmful effect of atmospheric oxygen. The keeping quality of the cleansing liquor may also be improved by covering it with a layer of a liquid of low specific gravity, such as a mineral oil.

The period of action of the foregoing solutions can be considerably shortened by increasing the temperature of the bath or by moving the cleansing solution.

By the addition of known wetting agents better penetration of the layer of corrosion and therefore more rapid cleansing can be secured. It is also possible to convert the solutions described above into paste form by the addition of thickening agents, such as cellulose ethers, gums, starch paste, dextrin, bentonite or finely ground wood meal.

The use of such pastes is more especially indicated in cases where the dimensions of the objects to be cleansed do not permit of using baths or where only certain constructional parts of large machines are to be cleansed.

For carrying out the process of the present invention there is a suitable composition of matter which comprises a water-soluble salt of an acid, which is free of nitrogen and forms water-soluble complex heavy metal compounds, and a strong reducing agent which reduces ferric salts to ferrous salts without the evolution of hydrogen and which possesses a stronger reducing powder than glucose. This composition of matter contains advantageously an alkali which, when dissolved in water, produces a pH-value of more than 7. The compositions of matter of this invention may contain as such alkalies, for example, ammonia, alkali bicarbonate or alkali carbonates.

The following examples illustrate the invention, the parts being be weight unless otherwise stated, and the relationship of parts by weight to parts by volume being the same as that of the kilogram to the liter:

Example 1

20 parts of Seignette salt, 5 parts of calcined sodium carbonate and 3 parts of sodium hydrosulfite are dissolved in 150 parts by volume of water. A rusty piece of iron sheeting is suspended in the solution in an open vessel, and left therein for 16 hours. At the end of this period the iron sheeting is washed with water and dried with a rag, the iron sheeting being obtained in a clean rust-free condition.

Instead of Seignette salt, the sodium salt of lactic acid may be used in similar manner.

Example 2

47.5 parts of a powder, consisting of 4.5 parts of sodium citrate, 4 parts of calcined sodium carbonate and 1 part of sodium hydrosulfite, are dissolved in 200 parts by volume of water. A heavily rusted iron screw is placed in the solution in an open vessel, and left therein for 16 hours. At the end of this period the screw can be washed clean with water. After being dried it can be lightly oiled in order to prevent it becoming rusted again.

Instead of sodium hydrosulfite there may also be used hydrazine sulfate.

Example 3

10 parts of Seignette salt are mixed into a homogeneous powder with 4 parts of calcined sodium carbonate, 2 parts of sodium hydrosulfite and 9 parts of finely ground wood meal. By stirring 5 parts of this mixture in 8 parts of water a thick pale yellow paste is obtained, which can be spread well with a paint brush. By applying to rusted iron parts a coating 2–5 mm. thick of the paste and allowing them to stand for 10–20 hours, all rust is removed in the case of a moderate degree of rusting. The metal objects are obtained in a clean condition by washing them. More heavily rusted metal objects are obtained in a clean state by a further application of the paste and subsequently washing it off.

Example 4

A metal screw, which has rusted fast and cannot even be turned by means of a screw wrench, is coated with a layer ½–1 cm. thick of the paste described in Example 3, and to which 0.5 per cent. of sodium diisobutyl-naphthalene sulfonate has been added. After 10 hours the paste is washed away. The screw can then be rotated without difficulty.

Example 5

10 parts of thioglycollic acid are dissolved in 200 parts by volume of water, and the solution is then mixed with a mixture of 15 parts of calcined sodium carbonate and 8 parts of sodium hydrosulfite. A piece of rusty iron sheeting is suspended in the alkaline solution, and the derusting tank is closed with a loosely fitting cover and allowed to stand for 16 hours. At the end of this period the rust has dissolved except for small traces, and the piece of sheeting is obtained in a clean state by washing it with water.

Example 6

200 parts by volume of crude sulfite waste liquor, as it is obtained in the manufacture of cellulose from wood, are mixed with 50 parts by volume of a sodium carbonate solution of about 15 per cent. strength, 10 parts of sodium hydrosulfite and 0.4 part of sodium diisobutyl-naphthalene sulfonate. There is suspended in the resulting alkaline solution, without removing the precipitated constituents therefrom, a rusted piece of iron sheeting. The vessel containing the bath is covered with a plate and the whole is allowed to stand for 16 hours. At the end of this time all the rust has dissolved, and after rinsing it with water the piece of metal is obtained in a clean state. By covering the derusting bath with a liquid of lower specific gravity, for example, mineral oil or butyl alcohol, its keeping quality can be considerably prolonged.

A derusting bath having a similar action is obtained by dissolving in water a corresponding mixture of dried and pulverized sulfite waste liquor, sodium carbonate and sodium hydrosulfite.

Instead of sulfite waste liquor there can also be used an alkali salt of a guaiacol sulfonic acid. Similarly, the sodium hydrosulfite may be replaced by hydrazine sulfate.

Example 7

A cotton cloth stained with rust is placed in a bath prepared by dissolving 10 parts of Seignette salt, 5 parts of calcined sodium carbonate and 3 parts of sodium hydrosulfite in 200 parts by volume of water. After allowing the whole to stand for 10 hours, the cloth is obtained in a clean condition after rinsing it with water.

Example 8

150 parts of crude pulverized tartar are mixed with 100 parts of calcined sodium carbonate, 10 parts of sodium hydrosulfite, 60 parts of fine wood meal, 120 parts of bentonite and 1 part of sodium diisobutyl-naphthalene sulfonate to form a homogeneous powder.

10 parts of this powder are introduced, while stirring, into 8 to 10 parts of water, whereby a thinly liquid or consistent paste is obtained, which is very well suited for removing rust which has not penetrated too deeply and for freeing metal screws which have rusted fast. For these purposes the metal object is coated with a layer of the paste 2 to 4 mm. thick, and, after 12 to 24 hours, the dried paste is removed with water and a brush.

In order to prevent subsequent rusting of the metal surfaces which have been freed from the coating of oxide, they are then dried with a rag and well oiled.

Example 9

60 parts of Seignette salt, 5 parts calcined sodium carbonate and 5 parts of hydrazine sulfate are dissolved in 200 parts by volume of water, and pieces of rusty iron sheeting are suspended in the clear solution thus obtained. After 16 hours the metal pieces are withdrawn from the bath; they are free of rust.

What I claim is:

1. A composition of matter consisting essentially of more than 0.1 and up to 20 per cent of a water-soluble hyposulfite, at least 1 and up to 50 per cent of a water-soluble salt of an acid which is free of nitrogen, forms water-soluble complex heavy metal compounds and is selected from the group consisting of aliphatic polybasic carboxylic acids and aliphatic hydroxy carboxylic acids containing at least one carboxylic acid group, and an alkali which, when dissolved in water, produces a pH-value greater than 7.

2. A composition of matter having the property, when applied as an aqueous solution, of cleaning materials contaminated with corrosion products of heavy metals, said composition of matter consisting essentially of 1 to 20 per cent of an alkali hyposulfite, 1 to 50 per cent of a water-soluble salt of an aliphatic hydroxy carboxylic acid which is free of nitrogen and contains at least one carboxylic acid group, and 2 to 8 per cent of an alkali which, when dissolved in water, produces a pH-value greater than 7.

3. A composition of matter according to claim 2, wherein the said salt is a water-soluble salt of tartaric acid and the said alkali, when dissolved in water, produces a pH-value of about 7.1 to 12.

4. A composition of matter according to claim 2, wherein the said salt is a water-soluble salt of citric acid and the said alkali, when dissolved in water, produces a pH-value of about 7.1 to 12.

5. An aqueous solution of a composition of matter as claimed in claim 4.

6. An aqueous solution of a composition of matter as claimed in claim 3.

CARLO ROSSI.

REFERENCES CITED

The following references are of record in the file of this patent:

UNITED STATES PATENTS

| Number | Name | Date |
|---|---|---|
| 216,805 | Park | June 24, 1879 |
| 1,151,416 | Stevenot | Aug. 24, 1915 |
| 1,571,829 | Wiese | Feb. 2, 1926 |
| 1,583,469 | Josselson | May 4, 1926 |
| 2,257,186 | Orthner et al. | Sept. 30, 1941 |